(12) United States Patent
Pyritz et al.

(10) Patent No.: US 6,881,919 B2
(45) Date of Patent: Apr. 19, 2005

(54) POWDER FEED NOZZLE FOR LASER WELDING

(75) Inventors: Clarence L. Pyritz, Waconia, MN (US); Frank G. Arcella, Eden Prairie, MN (US); Michael A. House, Chaska, MN (US)

(73) Assignee: Aeromet Corporation, Eden Prairie, MN (US)

( * ) Notice: Subject to any disclaimer, the term of this patent is extended or adjusted under 35 U.S.C. 154(b) by 0 days.

(21) Appl. No.: 10/746,727

(22) Filed: Dec. 26, 2003

(65) Prior Publication Data

US 2005/0023257 A1 Feb. 3, 2005

Related U.S. Application Data

(62) Division of application No. 10/113,861, filed on Apr. 1, 2002, now Pat. No. 6,696,664, which is a division of application No. 09/366,792, filed on Aug. 4, 1999, now Pat. No. 6,396,025.
(60) Provisional application No. 60/141,936, filed on Jul. 1, 1999.

(51) Int. Cl.[7] .............................. B23K 1/16; B23K 11/30
(52) U.S. Cl. ...................... 219/76.1; 219/76.12; 219/64
(58) Field of Search ............................ 219/76.1, 76.12, 219/64

(56) References Cited

U.S. PATENT DOCUMENTS

| 3,422,795 A | * | 1/1969 | Smith ......................... 118/308 |
| 3,947,653 A | | 3/1976 | Fairbairn ..................... 219/76 |
| 3,960,422 A | | 6/1976 | Shull ........................... 316/19 |
| 4,300,474 A | | 11/1981 | Livsey ........................ 118/641 |
| 4,462,511 A | | 7/1984 | Fulmer et al. ................ 222/52 |
| 4,482,375 A | | 11/1984 | Sastry et al. ................. 785/0.5 |
| 4,575,330 A | | 3/1986 | Hull .......................... 425/174.4 |
| 4,627,990 A | | 12/1986 | Saga et al. ..................... 427/10 |
| 4,681,258 A | | 7/1987 | Jenkins et al. ................ 239/66 |
| 4,724,299 A | | 2/1988 | Hammeke .................... 219/121 |
| 4,730,093 A | | 3/1988 | Mehta et al. ................ 219/121 |
| 4,743,733 A | | 5/1988 | Mehta et al. ................ 219/121 |
| 4,927,992 A | | 5/1990 | Whitlow et al. ......... 219/121.65 |
| 4,947,463 A | | 8/1990 | Matsuda et al. ......... 219/121.85 |
| 4,958,058 A | | 9/1990 | Scheidt et al. ........... 219/121.6 |
| 5,043,548 A | | 8/1991 | Whitney et al. ........ 219/121.47 |
| 5,076,869 A | | 12/1991 | Bourell et al. ............. 156/62.2 |
| 5,111,021 A | | 5/1992 | Jolys et al. .............. 219/121.6 |
| 5,121,329 A | | 6/1992 | Crump ........................ 361/468 |
| 5,122,632 A | | 6/1992 | Kinkelin ................ 219/121.63 |
| 5,126,529 A | | 6/1992 | Weiss et al. ............. 219/121.6 |
| 5,182,430 A | | 1/1993 | Lagain ................... 219/121.63 |
| 5,208,431 A | | 5/1993 | Uchiyama et al. ..... 219/121.65 |
| 5,245,155 A | | 9/1993 | Pratt et al. ............. 219/121.63 |

(Continued)

FOREIGN PATENT DOCUMENTS

| DE | 195 33 960 A1 | 3/1997 |
| WO | WO 97/04914 | 2/1997 |

OTHER PUBLICATIONS

Product Brochure of ESAB, "Fuel Gas Nozzles 4216 Series", prior to Jul. 1, 1999.

*Primary Examiner*—M. Alexandra Elve
(74) *Attorney, Agent, or Firm*—Westman, Champlin & Kelly, P.A.

(57) ABSTRACT

A powder feed nozzle for laser welding applications including a multiple outlet nozzle tip for focusing a discharged powder stream. The multiple outlet nozzle tip disperses multiple outlet streams and includes a powder discharge outlet and at least one focus gas discharge outlet, radially spaced from the powder discharge outlet, for dispersing a powder stream and a gas stream. Powder flows from a powder source through a powder channel to discharge a powder stream. Focus gas flows through a focus gas channel angled relative to the powder channel to discharge a focus gas stream.

19 Claims, 14 Drawing Sheets

U.S. PATENT DOCUMENTS

| | | | |
|---|---|---|---|
| 5,252,264 A | 10/1993 | Forderhase et al. ............ 264/22 |
| 5,303,141 A | 4/1994 | Batchelder et al. .......... 361/149 |
| 5,304,771 A | 4/1994 | Griffin et al. ........... 219/121.63 |
| 5,321,228 A | 6/1994 | Krause et al. .......... 219/121.84 |
| 5,359,907 A | 11/1994 | Baker et al. ............... 73/865.5 |
| 5,418,350 A | 5/1995 | Freneaux et al. ...... 219/121.84 |
| 5,460,851 A | * 10/1995 | Jenkins ....................... 427/199 |
| 5,477,025 A | 12/1995 | Everett et al. ......... 219/121.84 |
| 5,477,026 A | 12/1995 | Buongiorno ........... 219/121.84 |
| 5,486,676 A | 1/1996 | Aleshin ................. 219/121.63 |
| 5,488,216 A | 1/1996 | Farwer .................. 219/121.64 |
| 5,522,555 A | 6/1996 | Poole .......................... 241/33 |
| 5,556,560 A | 9/1996 | Ahola et al. ............ 219/121.45 |
| 5,579,107 A | 11/1996 | Wright et al. ................ 356/336 |
| 5,649,227 A | 7/1997 | Anezaki et al. ................. 419/2 |
| 5,676,866 A | 10/1997 | in den Baumen et al. ...................... 219/121.77 |
| 5,717,599 A | 2/1998 | Menhennett et al. .. 364/468.25 |
| 5,732,323 A | 3/1998 | Nyrhila ........................ 419/2 |
| 5,738,817 A | 4/1998 | Danforth et al. ............. 264/603 |
| 5,745,834 A | 4/1998 | Bampton et al. ............. 419/37 |
| 5,837,960 A | 11/1998 | Lewis et al. ........... 219/121.63 |

* cited by examiner

POWDER FEED NOZZLE FOR LASER WELDING

CROSS-REFERENCE TO RELATED APPLICATION

This application is a divisional of U.S. application Ser. No. 10/113,861, filed Apr. 1, 2002 now U.S. Pat. No. 6,696,664, and entitled "POWDER FEED NOZZLE FOR LASER WELDING", which is a divisional of U.S. application Ser. No. 09/366,792, filed Aug. 4, 1999 now U.S. Pat. No. 6,396,025 and entitled "POWDER FEED NOZZLE FOR LASER WELDING", which claims priority to U.S. Provisional Application Ser. No. 60/141,936, filed Jul. 1, 1999, and entitled "POWDER GAS FEED NOZZLE".

The Government may have certain rights to this invention under a Cooperative Research and Development Agreement (CRADA).

BACKGROUND OF THE INVENTION

The present invention relates to a nozzle for direct metal deposition and other laser welding applications. In particular, the present invention relates to a powder feed nozzle for use for direct metal deposition and other laser welding applications.

Laser welding applications use high powered lasers or other high energy sources to melt deposited material for welding. Laser welding is used to fabricate components by a direct metal deposition technique to form various shapes and forms. The deposited structure may be machined to a desired finish to complete the fabrication process.

Powder is dispersed from feed nozzles to a molten puddle or pool formed by the laser. Catchment is a term which refers to the amount of powder deposited to the molten pool relative to the amount of powder discharged or dispersed from the nozzle. If the dispersement profile of powder discharged from the nozzle is greater than the area of the molten pool or puddle, then catchment is poor since powder is dispersed to areas surrounding the molten pool in addition to the molten pool. Powder that is deposited outside of the molten pool can have certain deleterious effect on the metallurgical qualities and performance of the resulting structure as well as increased costs.

During a forming operation, molten and other material from the workpiece can spatter to the nozzle which can clog the nozzle. The closer the nozzle is to the workpiece the greater propensity that spatter will clog the nozzle. Residue spattered to the nozzle can alter the profile of powder dispersed from the nozzle or completely clog the nozzle. Reflected laser beams from the melt puddle can also sinter powder or melt the nozzle tip. The present invention addresses these and other problems.

SUMMARY OF THE INVENTION

The present invention relates to a powder feed nozzle for laser welding applications including a multiple outlet nozzle tip for focusing a discharged powder stream. The multiple outlet nozzle tip disperses multiple outlet streams and includes a powder discharge outlet and at least one focus gas discharge outlet, radially spaced from the powder discharge outlet, for dispersing a powder stream and a gas stream. Powder flows from a powder source through a powder channel to the powder discharge outlet for dispersement. Focus gas flows through a focus gas channel angled relative to the powder channel to discharge a focus gas stream.

DETAILED DESCRIPTION OF THE ILLUSTRATIVE EMBODIMENTS

Figure 1:
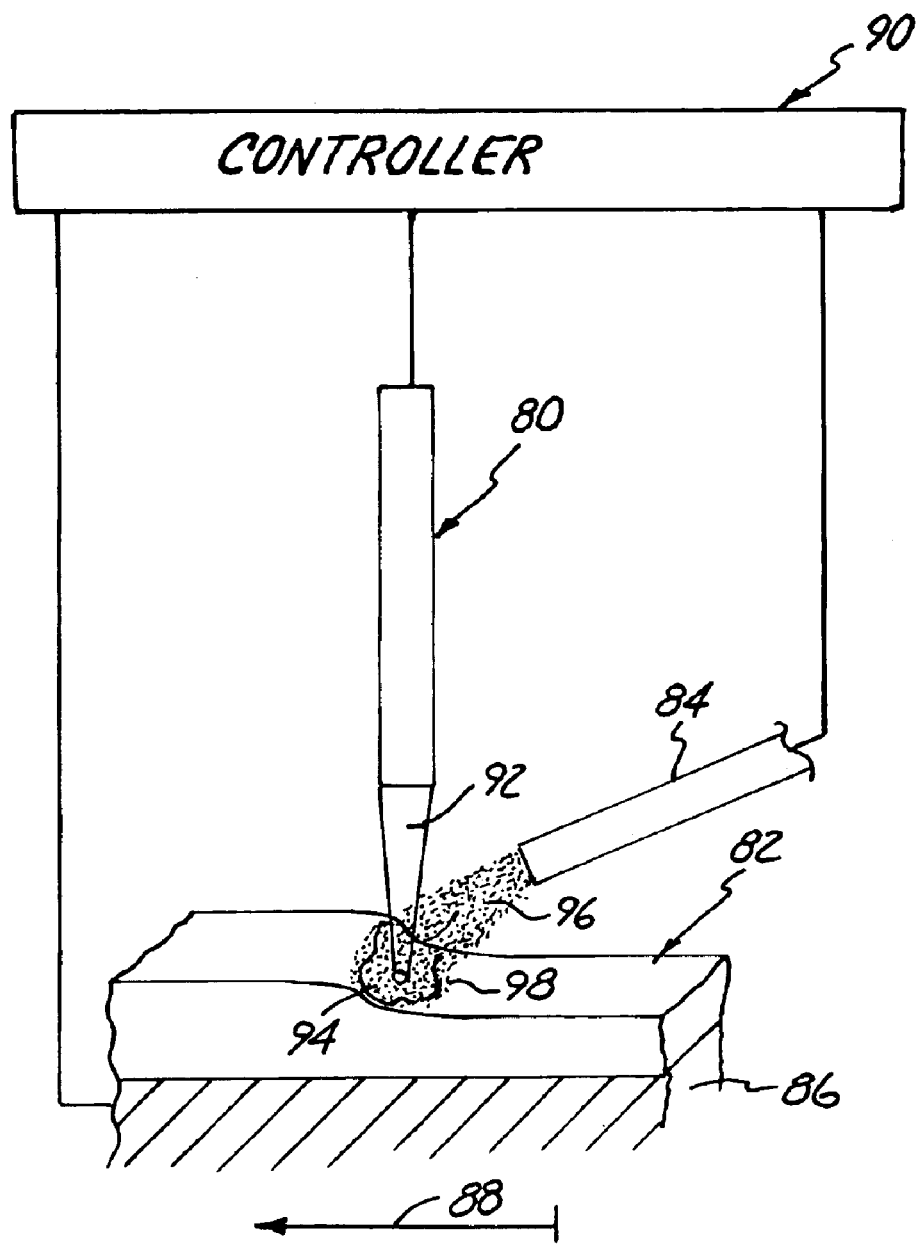
FIG. 1 is a illustration of a laser welding process.

FIG. 1 schematically illustrates a laser welding operation for direct metal deposition for fabricating components of various shapes and forms. Laser welding uses a laser 80, such a $CO_2$ laser to melt a powder, such as a titanium powder, deposited to a workpiece 82 from a powder source through a nozzle 84. Multiple layers of powder are deposited to workpiece 82 to form a fabricated component according to direct metal deposition techniques.

As shown in FIG. 1, workpiece 82 is supported on a welding table 86. In FIG. 1, welding table 86 movable supports the workpiece 82 as illustrated by arrow 88 relative to laser 80 and nozzle 84 for forming complex three dimensional components. Alternatively laser 80 and nozzle 84 can be movably supported relative to the workpiece 82 or fixed welding table 86. For deposition welding after each layer is formed, the nozzle 84 and laser 80 are indexed or raised to adjust the elevation of the nozzle 84 relative to the surface of the workpiece elevated by the deposited layer. Welding operation can be controlled by controller 90 as illustrated in FIG. 1.

Figure 2:
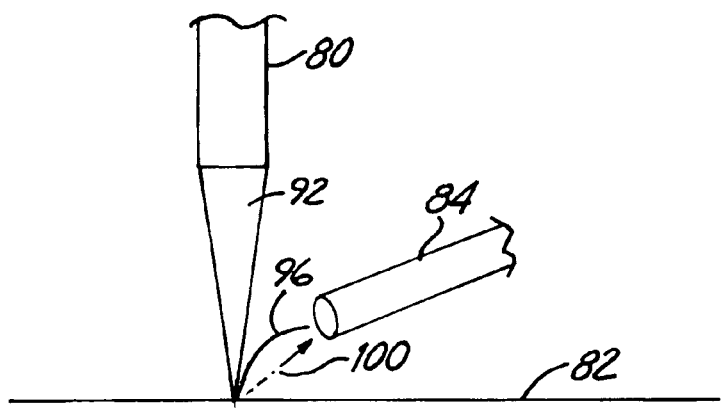
FIG. 2 is a detailed schematic illustration of deposition of powder to a workpiece.

Laser beam 92 from laser 80 forms a molten pool or envelope 94 on the workpiece 82. Nozzle 84 disperses a powder stream 96 to deposit a powder envelope 98 to the workpiece 82. For welding, powder envelope 98 is deposited to the molten pool or puddle 94 to melt the powder. For optimum catchment, the powder envelope 98 is targeted to optimize the amount of dispersed powder caught or contained in the molten pool 94. As shown in FIG. 1, in prior nozzles, powder is dispersed from nozzle 84 and is deposited to the workpiece under the influence of gravity. In such designs, dispersed powder can be caught outside of the molten pool or puddle resulting in poor catchment of the powder in the molten pool or puddle 94. As shown in FIG. 2, during forming operation, laser beam 92 or spatter from the molten pool can reflect back to the nozzle as illustrated by arrow 100. Reflected spatter can plug powder discharge openings altering the geometry and profile of the dispersed powder stream (and envelope 98). The reflected laser beam 92 can melt the nozzle and powder also plugging powder discharge openings.

Figure 3:
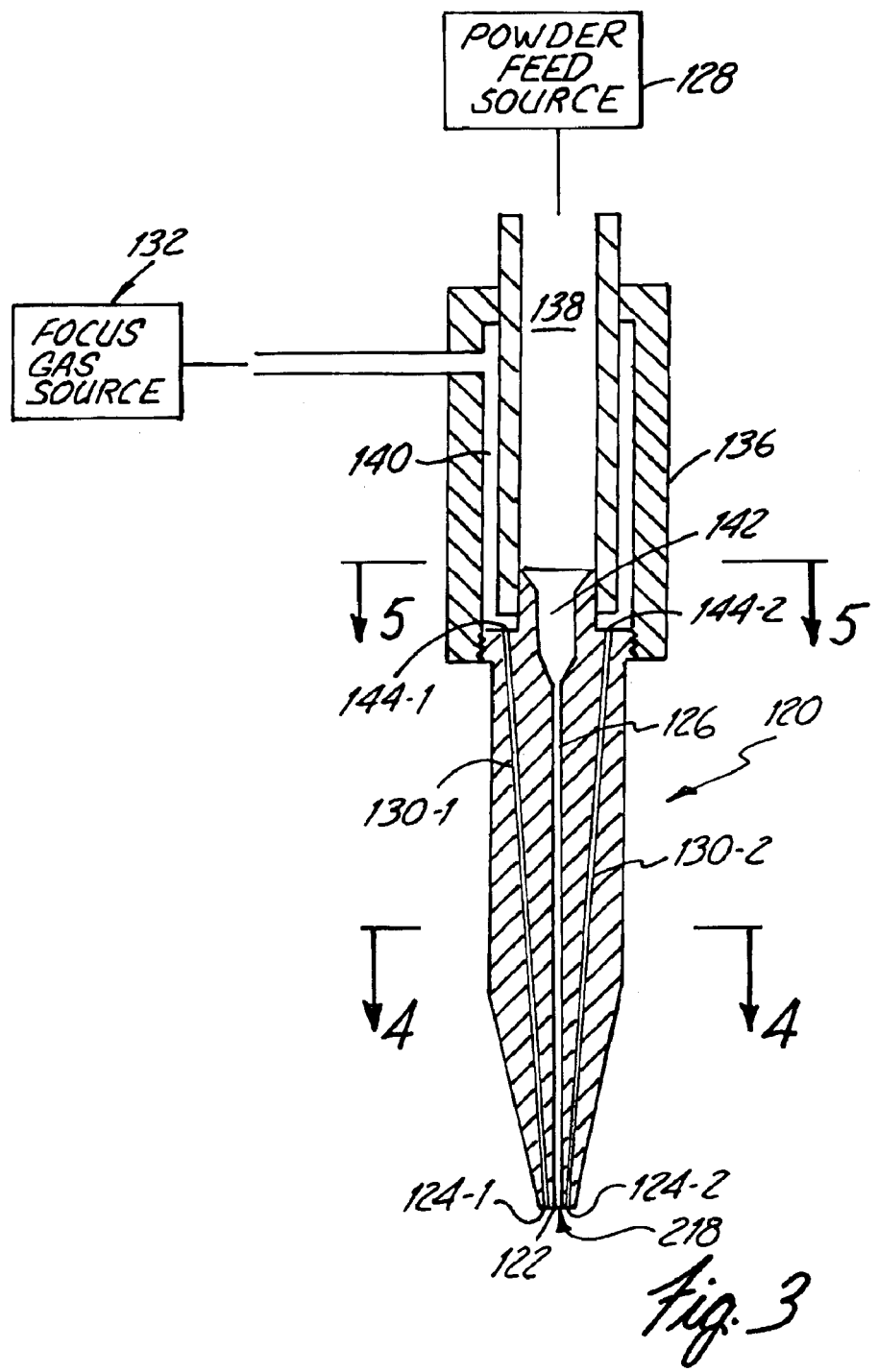
FIG. 3 is a cross-sectional view of an embodiment of a powder feed nozzle of the present invention for laser welding applications.
Figure 4:
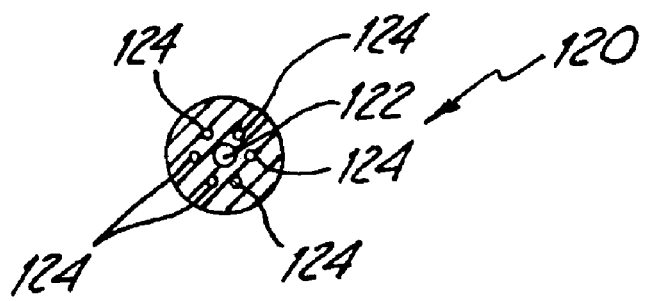
FIG. 4 is a cross-sectional view as taken along lines 4—4 of FIG. 3.
Figure 5:
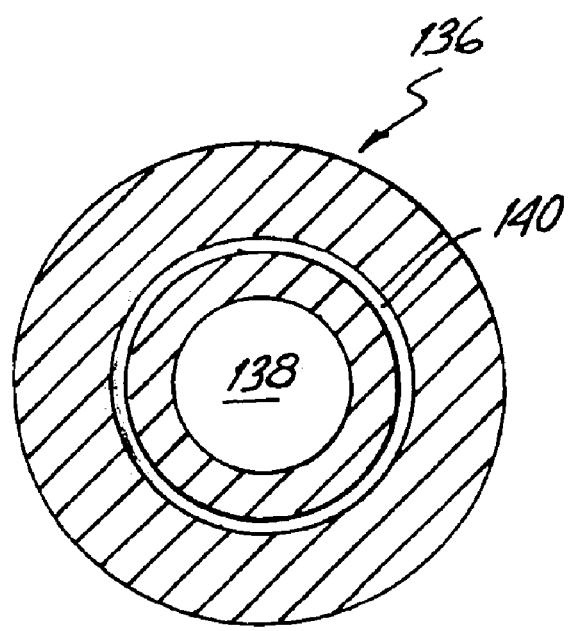
FIG. 5 is a cross-sectional view as taken along lines 5—5 of FIG. 3.

FIGS. 3–5 illustrate an embodiment of a multiple outlet nozzle tip 120 for depositing powder to a molten spot 94. Nozzle tip 120 includes a powder discharge outlet 122 and focus gas discharge outlet 124 radially spaced from the powder discharge outlet 122. Powder discharge outlet 122 is in fluid communication with a powder feed channel 126 extending through the nozzle tip 120 and coupleable to a powder source 128 for discharging a powder stream from the nozzle tip. Focus gas discharge outlet 124 is in fluid communication with a focus gas channel 130 coupleable to a focus gas source 132. Focus gas channel 130 is angled relative to powder feed channel 126 to discharge a focus gas stream directed toward the powder stream to focus the powder stream for controlling the dispersed profile of the powder stream for optimum catchment.

Figure 6:
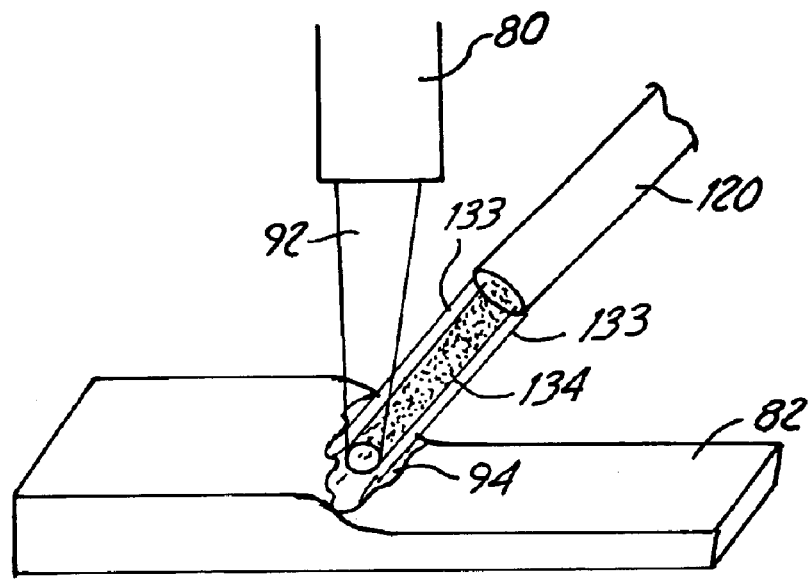
FIG. 6 illustrates deposition of a tight focused powder stream to a workpiece.
Figure 7:
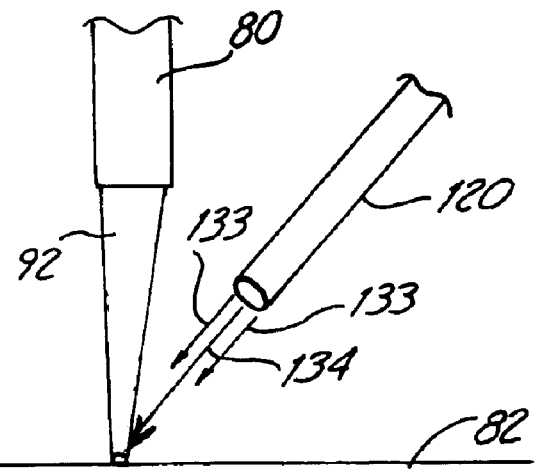
FIG. 7 schematically illustrates deposition of a tight focused power stream to a workpiece.

As illustrated in FIGS. 6–7, the focus gas stream 133 discharged provides a tight powder stream 134 with increased velocity for depositing powder to the molten pool 94. The tight focused powder stream 134 blocks or decouples the nozzle tip 120 from back reflections of the laser and provides a more dense moving mass to intercept spatter in flight toward the nozzle tip 120. The focus gas stream 133 and powder stream 134 opaque the nozzle from laser reflections.

In FIGS. 3–5, nozzle tip 120 includes a plurality of focus gas channels 130-1 to 130-$n$ and outlets 124-1 to 124-$n$ concentrically arranged about the powder feed channel 126 and outlet 122 to focus or pinch discharged powder to provide a tight dispersement profile of the powder for increased catchment. Powder debris from the powder stream or weld spatter can be reflected from the workpiece or sprayed back to the nozzle after being discharged. Reflected powder can clog the powder discharge outlet changing the profile of the discharge outlet and the discharged powder stream. The plurality of spaced focus gas outlets 124-1 to 124-$n$ provides multiple spaced smaller openings in contrast to a single opening to limit the effects of power debris reflected to the nozzle. Thus, if one of the openings 124-1 to 124-$n$ becomes clogged, other openings remain functional to focus the powder stream.

The focus gas is an inert gas. In one embodiment Helium gas is used as a focus gas for a welding process using an argon gas welding chamber. During welding operations, the high energy of a $CO_2$ laser beam would couple with and ionize the Argon, forming a plasma. The Helium focus gas dilutes the Argon gas at the high energy focal point of the laser to decouple or shield the laser energy from the Argon gas to limit ionization of the Argon gas at the high energy point of the welding operation.

In FIGS. 3 and 5, nozzle tip 120 is coupled to nozzle base 136 having a powder supply line 138 and an annular focus gas chamber 140. Powder supply line 138 is coupled to powder source 128 so that powder flows from powder source 128 through supply line 138. Powder supply line 138 is in communication with powder channel 126 through a tapered smooth transition 142 connecting the larger diameter supply line 138 and smaller diameter channel 126. The smooth transition 142 reduces sharp edges between supply line 138 and channel 126 to avoid powder catching on sharp edges. Annular focus gas chamber 140 surrounds the powder supply line 138 and is in communication with a plurality of inlets 144-1 to 144-$n$ to channels 130-1 to 130-$n$. Focus gas chamber 140 is filled with focus gas for discharge through discharge outlets 124-1 to 124-$n$.

Figure 8:
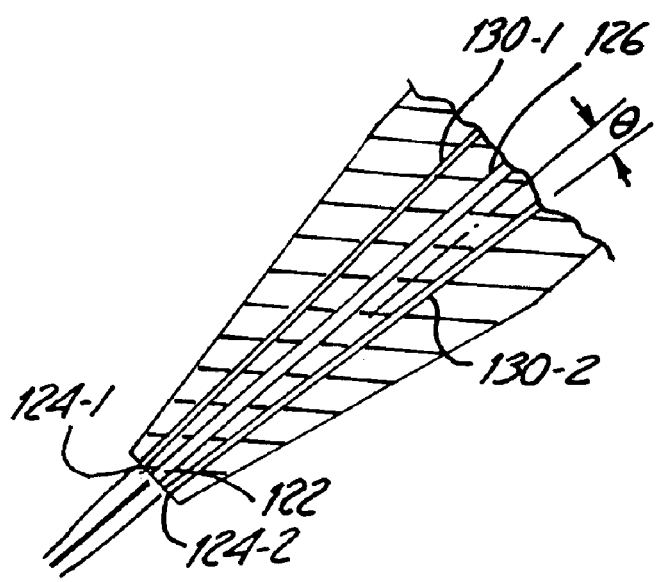
FIG. 8 is a detailed cross-sectional view of an end portion of the nozzle tip illustrated in FIG. 3.

As shown in FIGS. 3 and 8, powder channel 126 has a constant cross-sectional profile along an extent of the nozzle tip 120 to the discharge opening 122. The constant cross-sectional profile provides a relatively laminar flow of powder from an inlet (at smooth transition 142 in FIG. 3) through the powder channel 126 to the discharge opening 122 to discharge a relatively laminar flow powder stream from the nozzle tip. Preferably, powder flow through channel 126 is with an inert gas assist, such as an Argon or Helium gas assist.

As shown, focus gas channels 130-1 to 130-$n$ are radially spaced from powder channel 126 and have a relatively constant flow diameter and profile from inlet 144-1 to 144-$n$ to outlets 124-1 to 124-$n$ to provide a laminar gas flow for a controlled focus gas stream. Focus channels 130-1 to 130-$n$ are angled e, as illustrated in FIG. 8, relative to powder channel 126 so that the gas stream discharged from outlets 124-1 to 124-$n$ is directed towards the discharged powder stream to pinch the powder stream to provide a tight powder stream with increased velocity so that the powder stream is caught in the molten pool 94 as illustrated in FIG. 6.

Figure 9:
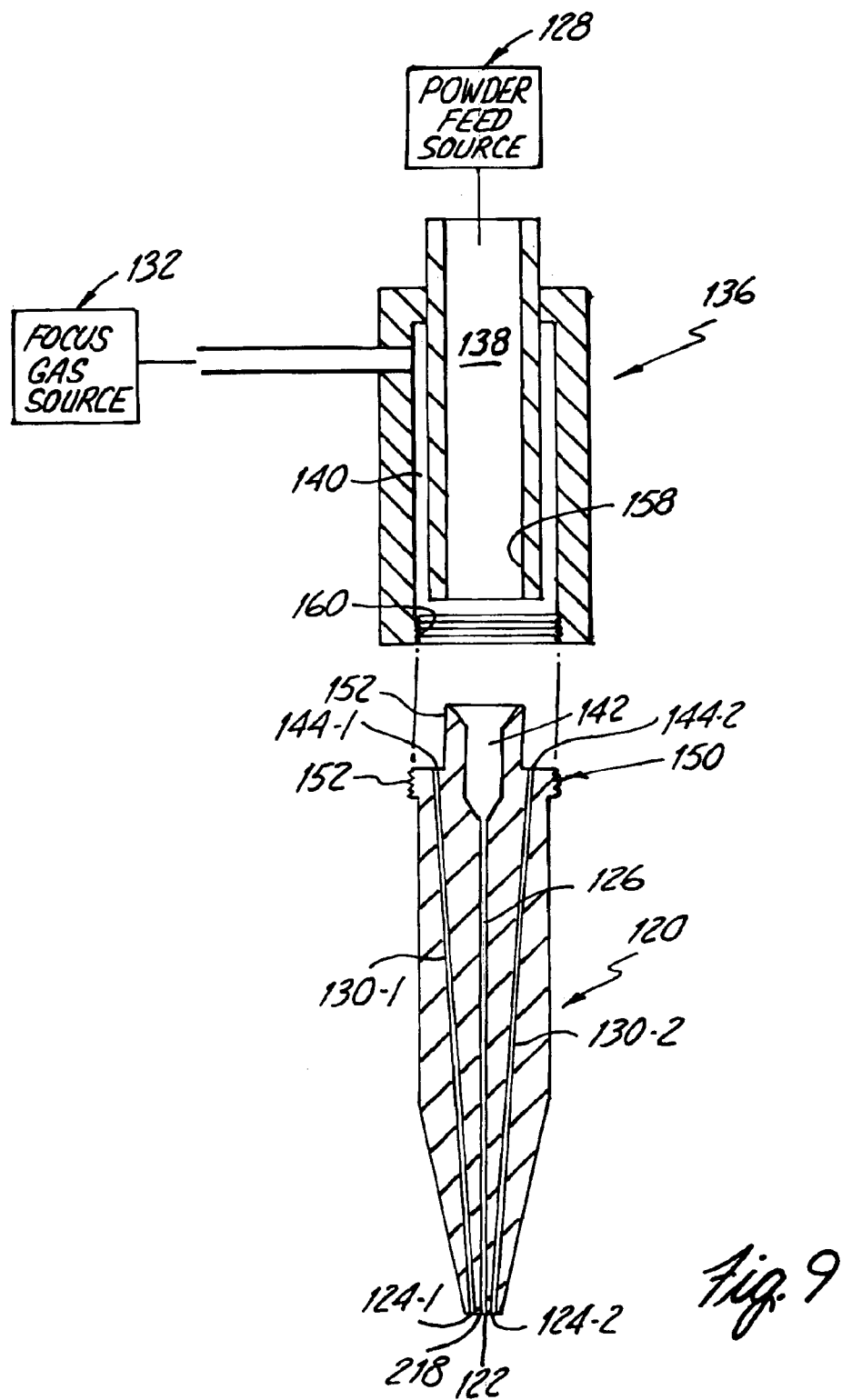
FIG. 9 is an exploded view of the embodiment of the nozzle of FIG. 3.

As shown in FIG. 9, nozzle tip 120 is removable coupled to nozzle base 136. As shown nozzle tip 120 includes a stepped stem 150 having a stepped tip 152, threaded outer collar 154 and smooth transition 142. Supply line 138 has an opened end 158 and annular chamber of nozzle base 136 includes an opened threaded end 160. Stepped tip 152 is press fit into opened end 158 to close powder supply line 138 and outer collar 154 is threaded to end 160 to removably connect annular chamber 140 and supply line 138 to nozzle tip. Thus, as described, powder supply line 138 and annular chamber 140 are fluidly coupled to powder feed channel 126 and focus gas channels 130, respectively. The nozzle tip 120 can be easily removed from the nozzle base 136 and replaced when powder and focus gas outlets 122, 124-1 to 124-$n$ are clogged for continued use. A nozzle tip described can be constructed from a four-inch gas torch nozzle available from ESAB Welding and Cutting Products of Florence, S.C. 29501.

Figure 10:
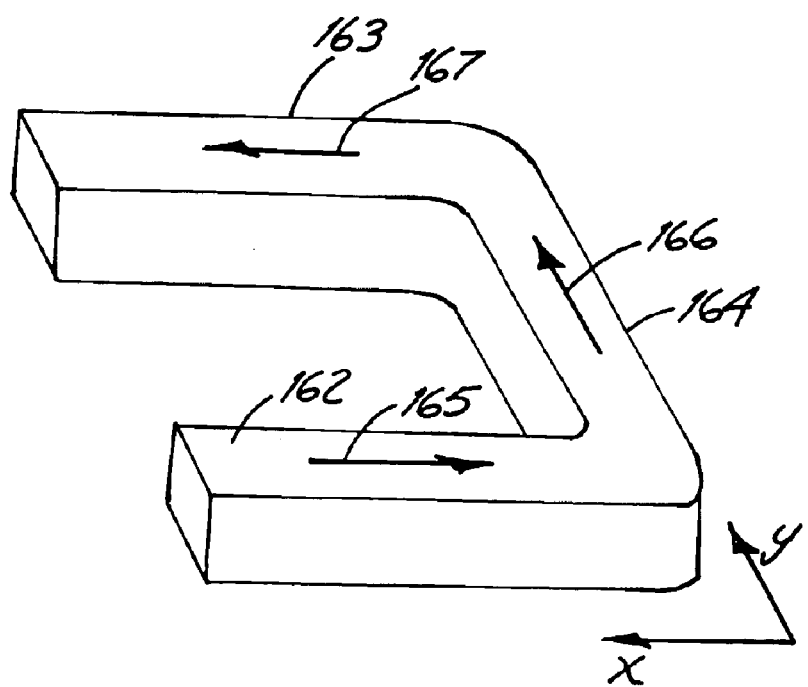
FIG. 10 illustrates a deposited structure formed by an omni-directional deposition process.

Direct metal deposition can be used to fabricate complex shapes. The present invention relates to an omni-directional deposition process for forming complex shapes, for example a "U" shaped element 161 as illustrated in FIG. 10 (or circular element (not shown)), without stopping or resetting the position or orientation of the nozzle outlet. As shown in FIG. 10, "U" shaped element includes opposed legs 162, 163 connect by transverse leg 164. Legs of the "U" shaped element are formed by omni-directional deposition or application of powder as illustrated by arrows 165, 166, 167.

Figure 11:
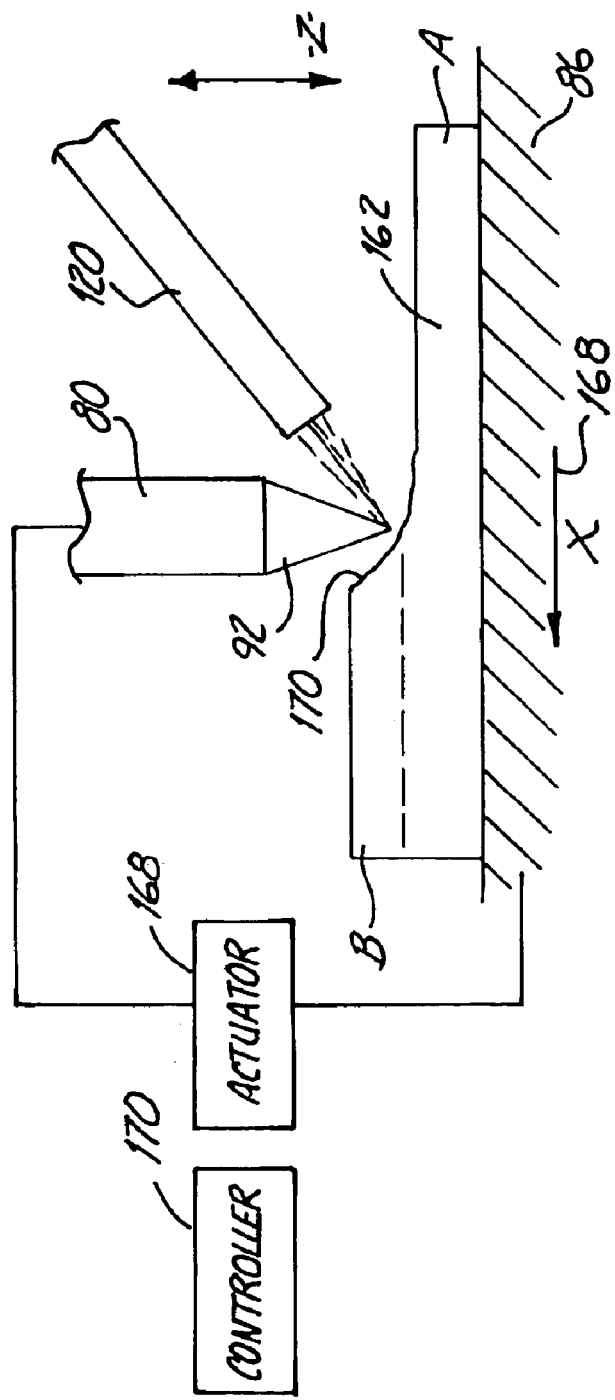
FIG. 11 illustrates deposition of layer B-1 to a workpiece along a first leg.
Figure 12:
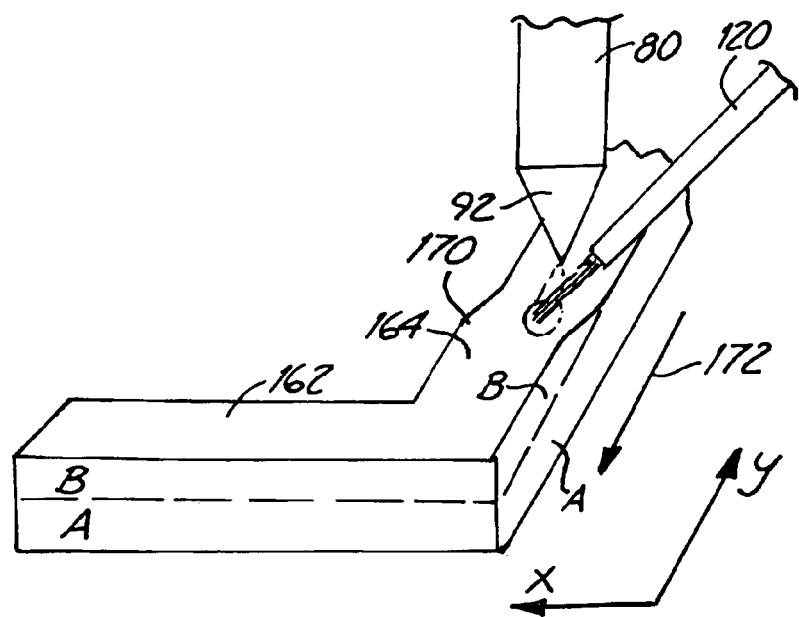
FIG. 12 illustrates deposition of layer B-2 to a workpiece along a second leg.
Figure 13:
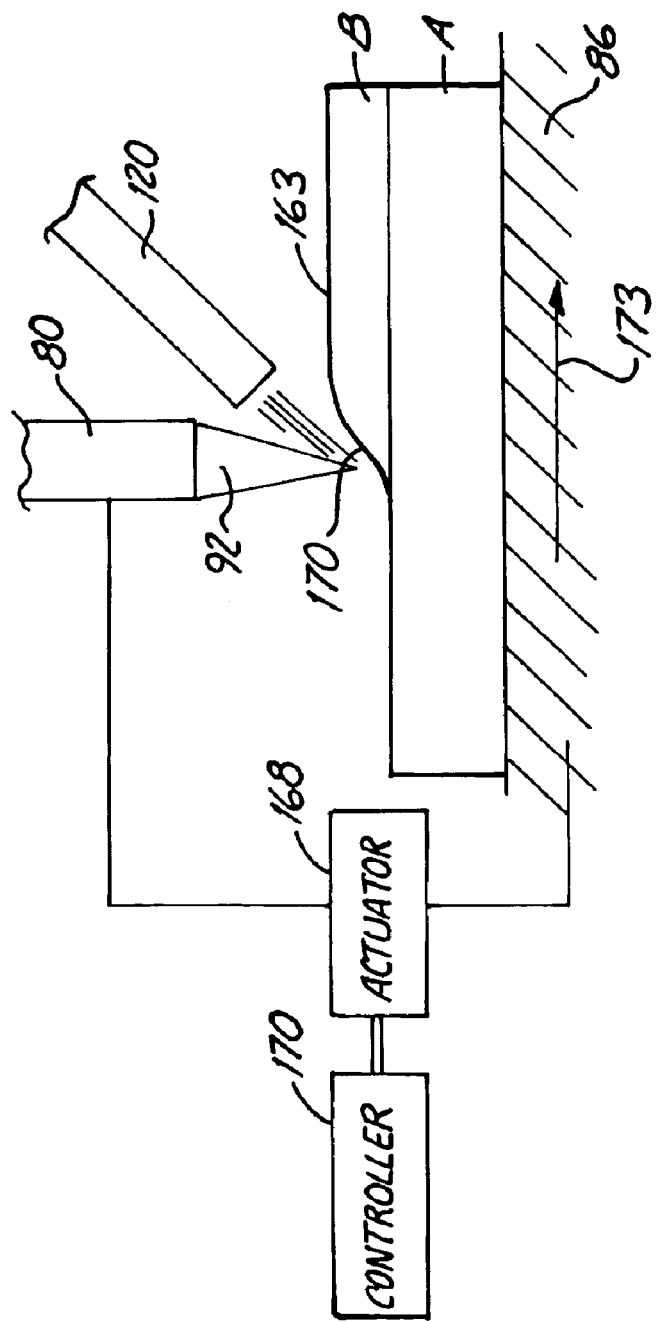
FIG. 13 illustrates deposition of layer B-3 to a workpiece along a third leg.

FIGS. 11–13 illustrate an omni-directional deposition process forming the "U" shaped element illustrated in FIG. 10, although it should be understood that application of omni-directional deposition is not limited to a "U"shaped element. In FIG. 11, workpiece is moved along an x-axis relative to laser and nozzle as illustrated by arrow 168 to deposit layer B-1 along leg 162. In FIG. 11, nozzle is positioned forward of a crown 170 of layer B-1 during the deposition process along leg 162. In FIG. 12, workpiece moves transverse to leg 162 along a y-axis as illustrated by arrow 172 to deposit layer B-2 along leg 164. As shown, nozzle is laterally orientated relative to crown 170. In FIG. 13, workpiece moves along the x-axis in an opposed direction illustrated by arrow 173 to deposit layer B-3 along leg 163. In FIG. 13, nozzle is positioned rearward of crown 170. Thus, as illustrated, components are fabricated by an omni-directional deposition process where powder is deposited by a nozzle positioned in multiple orientations relative to the crown 170 (e.g. forward, rearward or lateral orientation relative to the crown 170). Successive layers (along the z-axis) are deposited via omni-directional deposition for fabricating complex components or a component having a single leg or orientation.

The orientation of the nozzle is fixed relative to the laser so that nozzle outlet is orientated behind, rearward or lateral of the crown 170 as illustrated in FIGS. 11–13. The tight powder stream dispersed from the nozzle facilitates deposition of powder regardless of the forward, rearward or lateral orientation of the nozzle relative to the crown 164. For operation, movement omni-directional movement (in an x, y or x-y direction) of the nozzle and workpiece is implemented by actuator 172 under control of controller 174 configured for omni-directional movement of actuator 172. Actuator 172 can be a motor drive and can move the workpiece table 86 or nozzle 120 in an x, y, or x-y direction for complex welding operations.

Figure 14:
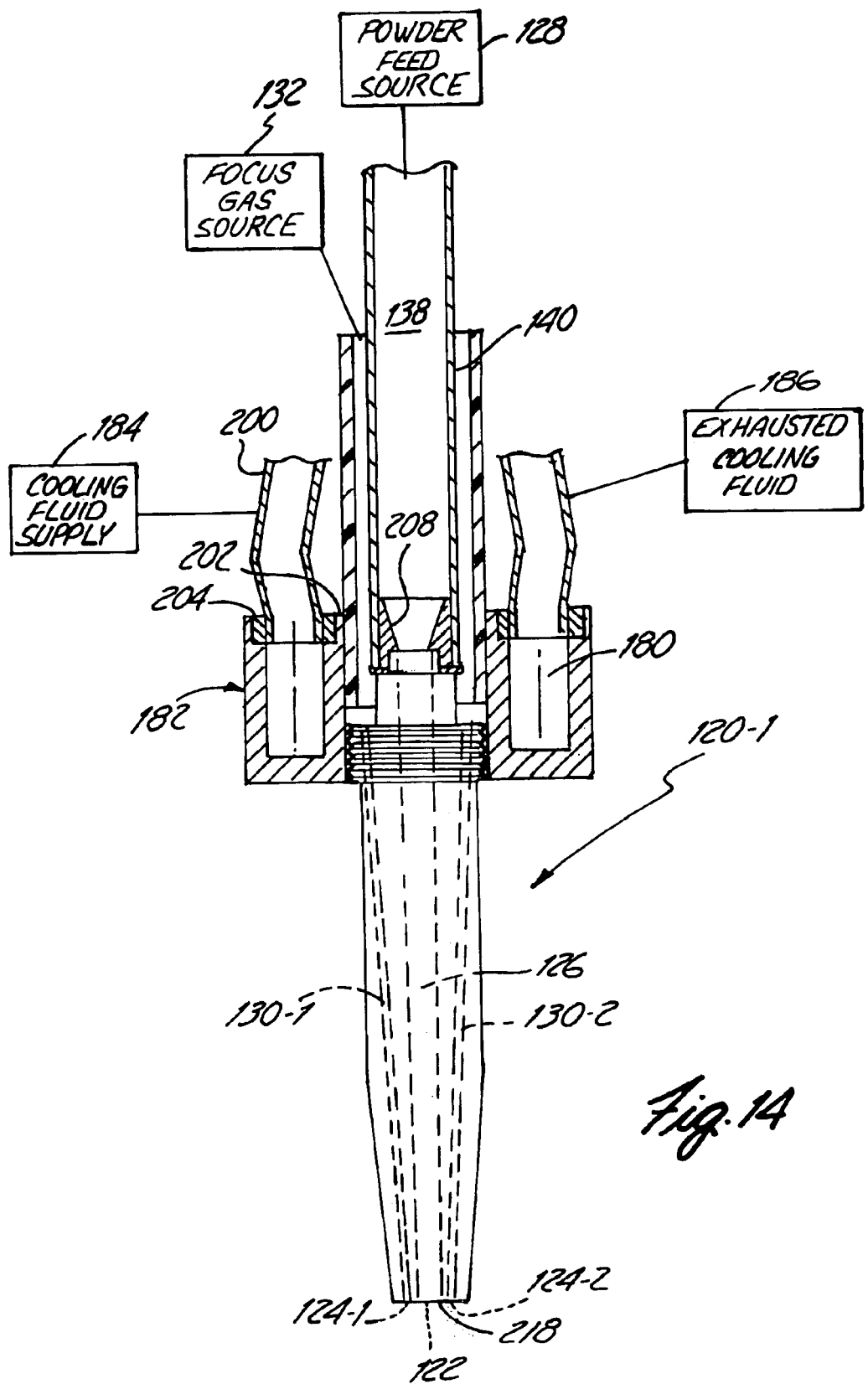
FIG. 14 is a cross-sectional view of an alternate embodiment of a powder feed nozzle of the present invention including a cooling collar.

FIG. 14 illustrates an embodiment of a nozzle tip 120-1 including a cooling chamber 180, where similar numbers are used to identify similar parts of nozzle tip 120-1. As shown in FIG. 14, nozzle tip supports a cooling collar 182 having cooling chamber 180 formed therein coupled to a fluid cooling source 184, for example water. Cooling fluid is pumped from cooling fluid source 184 for circulation in cooling chamber 180. Cooling fluid is continuously circulated through chamber 180 to reduce operating temperature of the nozzle positioned proximate to the focal point of laser 80. Cooling fluid is exhausted from chamber 180 as illustrated by block 186.

Figure 15:
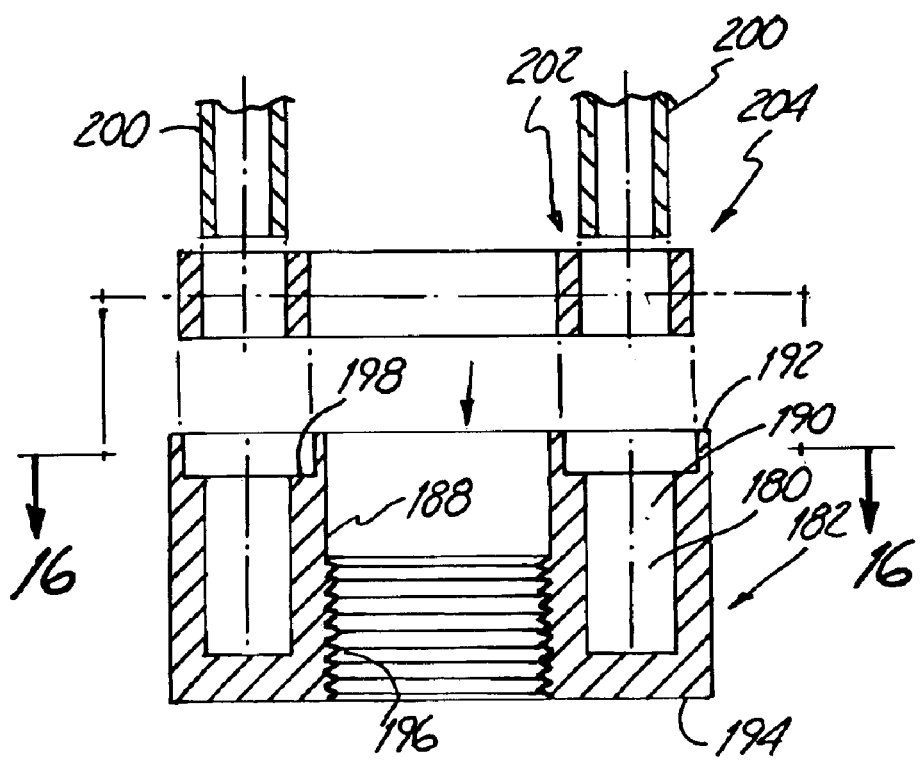
FIG. 15 is a cross-sectional view of an embodiment of a cooling collar for a powder feed nozzle.
Figure 16:
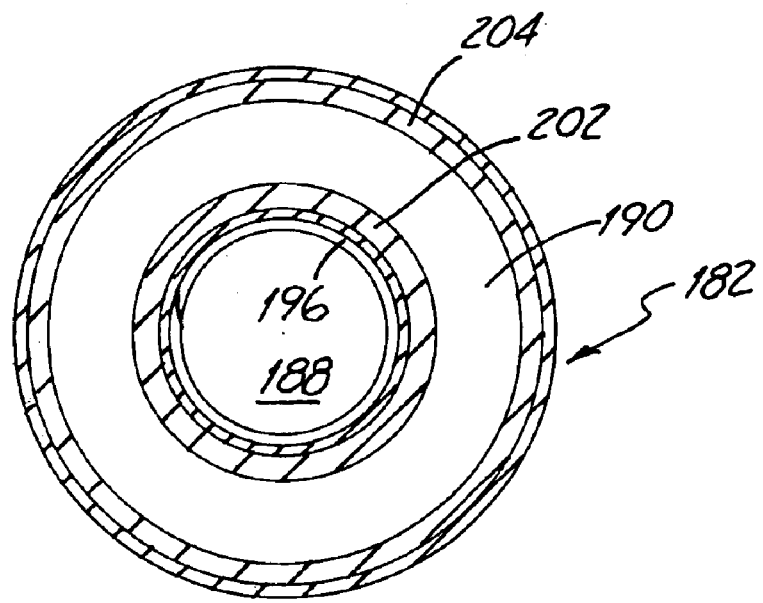
FIG. 16 is a cross-sectional view as taken along line 16—16 of FIG. 15.

FIGS. 15–16 illustrate an embodiment of cooling collar 182. As shown cooling collar 182 is formed of an annular member having a central opening 188 sized for placement about nozzle tip 120-1 and an annular channel 190 extending about central opening 188. Opening 188 extends between opposed first and second spaced ends 192, 194 of collar 182 and is opened at opposed ends 192, 194 for placement about nozzle tip 120-1. Opening 188 is internally threaded 196 for attachment to the nozzle tip 120-1.

Annular channel 190 has an annular stepped opening 198 formed at the first end 192. Hosing 200 for pumping fluid into and out of chamber 180 is shown diagrammatically in FIG. 13. Hosing 200 is connected to rings 202, 204 which are seated in the stepped opening 198 to connect chamber 180 (formed by annular channel 190) to cooling fluid source and to exhaust cooling fluid. As shown, in one embodiment cooling collar 182 is positioned proximate to a first end of the nozzle tip 120-1 spaced from discharge outlets 122, 124. Nozzle tip 120-1 is formed of a solid block having channels 126, 130 formed (or bored) therethrough. The solid nozzle tip 120 provides a continuous heat transfer path axially along the nozzle tip 120 (along the length of the powder channel 126 and focus gas channels 130-1 to 130-*n*) to cool the discharge openings 122, 124-1 to 124-*n* and the nozzle tip facing the molten pool. In addition, a Helium focusing gas flowing in channels 130-1 to 130-2 has a high heat capacity and also assists in the cooling of the nozzle.

In particular, a solid interface separates the spaced channels 126, 130-1 to 130-*n* to provide a thermally conductive path from the cooling collar 182 along the length of the channels 126 and 130-1 to 130-*n*. The plurality of spaced focus gas outlets 124-1 to 124-*n* shown provides more surface area surrounding the discharge outlets for providing a conductive path surrounding each outlets 122, 124-1 to 124-*n* for maintaining the temperature of the outlets 122 and 124-1 to 124-*n*. Preferably, nozzle tip 120 is formed of a single block of copper material with high thermal conductivity for optimum heat transfer.

Figure 17:
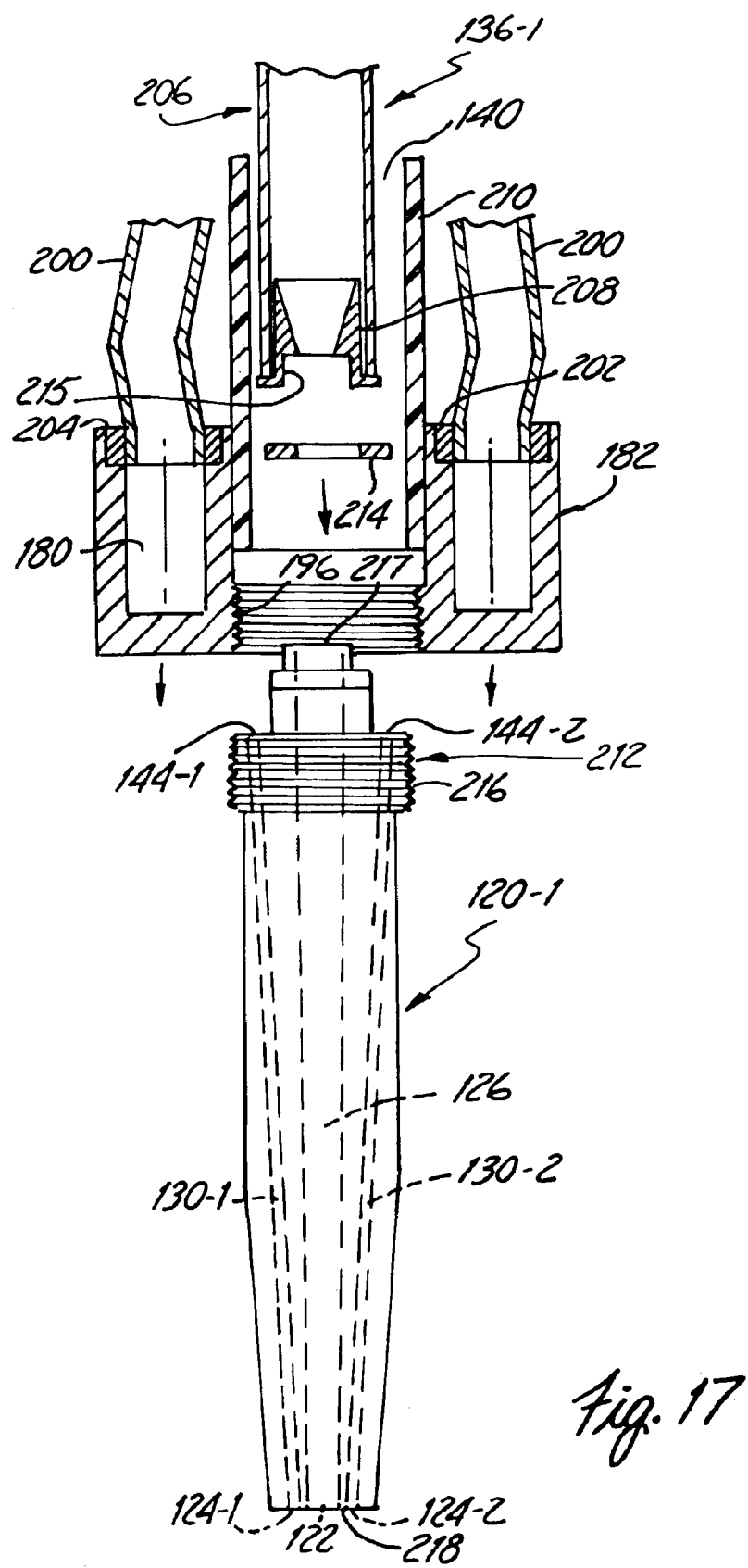
FIG. 17 is an exploded view of the powder feed nozzle illustrated in FIG. 14.

FIG. 17 is an exploded view illustrating removable assembly of nozzle tip 120-1 to nozzle base 136-1. As shown, a separate smooth transition section 208 (formed separately from nozzle tip 120-1) is welded to an inner tube 206 forming powder supply line 138 and collar 182 is welded to outer tube 210 of nozzle base 136-1. A stepped end 212 of nozzle tip extends through a compressible sealing ring 214 and is press fit into a bore 215 of smooth transition section 208. Threaded portion 216 of stepped end 212 threadably engages threads 196 of collar 182 to removeably connect nozzle tip 120-1 to nozzle base and cooling collar 182. The extent between threaded portion 216 and tip 217 of stepped end 212 is sized so that when nozzle tip is threaded to collar 182, tip 217 compresses against compressible sealing ring 214 to provide a fluid tight seal to separate powder from focus gas and fluidly connect powder supply line 138 and channel 126. Threaded connection between threaded portion 216 and threads 196 fluidly couples channels 130-1 to 130-*n* of nozzle tip to outer tube 210.

As shown, the nozzle tip 120 has a relatively flat end face 218 normal to the axis of channel 126 so that discharge openings are on the same plane and radially spaced for focusing the discharged powder into a tight powder stream to direct powder to molten pool 94 for increased catchment and decouple the nozzle from back reflections of the laser. Thus, as described, the multiple outlet nozzle discharges a powder stream and a focus gas stream to focus and opaque the nozzle from laser reflections.

Although the present invention has been described with reference to preferred embodiments, workers skilled in the art will recognize that changes may be made in form and detail without departing from the spirit and scope of the invention.

What is claimed is:

1. A method for depositing material to a workpiece comprising steps of:
    depositing a first layer of material to the workpiece through a nozzle including an outlet having a first orientation relative to a crown of deposited material; and
    depositing a second layer of material to the workpiece through the nozzle with the outlet having a second orientation relative to the crown of the deposited material.

2. The method of claim 1 wherein the second orientation is opposed to the first orientation.

3. The method of claim 1 wherein the steps of depositing the first and second layers of material include:
    moving the workpiece or the nozzle to deposit the first and second layers of material to the workpiece.

4. The method of claim 3 wherein the step of moving the workpiece or the nozzle comprises:
   moving the workpiece or the nozzle in a first direction to deposit the first layer of material; and
   moving the workpiece or the nozzle in a second direction to deposit the second layer of material.

5. The method of claim 1 wherein the second layer is deposited on the first layer.

6. The method of claim 1 and further comprising the step of forming a molten pool or puddle and depositing the first and second layers of material relative to the molten pool or puddle.

7. The method of claim 6 wherein the molten pool or puddle is formed using a laser.

8. The method of claim 7 wherein the nozzle is supported off-axis of the laser and the steps of depositing the first and second layers of material comprises the steps of:
   moving the laser and the nozzle or the workpiece in a first direction to deposit the first layer of material; and
   moving the laser and the nozzle or the workpiece in a second direction to deposit the second layer of material.

9. The method of claim 1 wherein the first orientation is forward of the crown and the second orientation is aft or rearward of the crown.

10. The method of claim 8 wherein a powder is discharged through the nozzle to deposit the first and second layers of material.

11. A method of depositing material to a workpiece comprising steps of:
    moving the workpiece or deposition assembly including a laser and a nozzle orientated off axis relative to the laser in a first direction to deposit a first material stream; and
    moving the workpiece or the deposition assembly in a second direction relative to the first direction to deposit a second material stream.

12. The method of claim 11 wherein the second direction is opposed to the first direction.

13. The method of claim 11 wherein a powder is discharged through the nozzle to deposit the first and second material streams.

14. A method of depositing material to a workpiece comprising the steps of:
    depositing a first material stream from a nozzle orientated in a first direction relative to a crown of deposited material; and
    depositing a second material stream from the nozzle orientated in a second direction relative to the crown of the deposited material.

15. The method of claim 14 wherein the nozzle is orientated forward of the crown of the deposited material in the first direction and aft or rearward of the crown of the deposited material in the second direction.

16. The method of claim 14 wherein the second direction is angled relative to the first direction.

17. The method of claim 14 wherein the second direction is opposed to the first direction.

18. The method of claim 14 wherein the first and second material streams are deposited to a molten pool or puddle on the workpiece.

19. The method of claim 14 and comprising the steps of:
    moving the workpiece or the nozzle in a first direction while depositing the first material stream; and
    moving the workpiece or the nozzle in a second direction while depositing the second material stream.

* * * * *